United States Patent [19]

Battersby

[11] 3,957,406
[45] May 18, 1976

[54] HOT MELT APPLICATORS

[75] Inventor: William R. Battersby, Lexington, Mass.

[73] Assignee: USM Corporation, Boston, Mass.

[22] Filed: Feb. 28, 1975

[21] Appl. No.: 554,157

Related U.S. Application Data

[60] Continuation of Ser. No. 363,363, May 24, 1973, Pat. No. 3,868,805, which is a division of Ser. No. 137,274, April 26, 1971, Pat. No. 3,759,771.

[52] U.S. Cl.................................. 425/87; 118/411; 401/193; 425/458
[51] Int. Cl.²........................................ B28B 11/04
[58] Field of Search ............ 425/87, 458; 118/408, 118/411, 412; 401/48, 193; 141/101, 102, 125, 280

[56] References Cited
UNITED STATES PATENTS

| | | | |
|---|---|---|---|
| 1,864,176 | 6/1932 | Baker | 425/87 X |
| 2,065,298 | 12/1936 | Abbott | 425/87 |
| 2,763,019 | 9/1956 | Huber | 425/87 X |
| 3,140,504 | 7/1964 | Knops | 401/193 |
| 3,632,371 | 1/1972 | Mikulka | 118/411 X |

Primary Examiner—Richard B. Lazarus
Attorney, Agent, or Firm—Carl E. Johnson; Vincent A. White; Richard B. Megley

[57] ABSTRACT

A multi-port applicator for supplying bonding and sealing material(s), for instance to elongated channels and/or recesses, and to members for fitting within channels. The applicator comprises at least two heatable heads in tandem, the trailing head having an orifice arranged for depositing molten thermoplastic on the same or other adhesive material supplied by a preceding or leading head orifice. Opposite sides of the heads are of configuration complemental to the walls defining the space to be filled, for example the peripheral channel of a double glazed unit. The trailing head may include a smoothing follower to shape the deposited material while it is still soft and insure a substantially uniform depth of total deposit.

4 Claims, 7 Drawing Figures

HOT MELT APPLICATORS

This a continuing application of copending application Ser. No. 363,363 filed May 24, 1973 entitled "Double Glazing Unit", now Pat. No. 3,868,805 which was a division of Application Ser. No. 137,274 filed Apr. 26, 1971, now U.S. Pat. No. 3,759,771 issued Sept. 18, 1973.

This invention relates to a hot melt applicator of the plural orifice type, and especially to such a device providing an extruded barrier to moisture.

BACKGROUND OF THE INVENTION

1. Field of the invention

Double glazing units comprising two sheets of glass secured together in spaced, sealed relationship are increasingly being used to provide thermally insulated windows. A widely used method of making such units is to provide a spacer, usually a metallic channel member, between two sheets of glass in a relation providing a shallow trough around the margins of the assembled panes and to fill this trough with a curing type sealant which commonly is a mixture of a polysulfide polymer and an epoxy resin. When cured this sealant provides a bond holding the assembly together and prevents entry of moisture or dust into the space between the panes of glass. However, this sealant material is expensive and must be carefully compounded in order to remain in place during the time required for the sealant to gel to a condition in which it does not flow out of the desired relationship to the assembly. Also it requires a lengthy period, up to 48 hours before the cure of the sealant has proceeded to a point enabling the assembly to be handled without damaging the joint.

SUMMARY OF THE INVENTION

It is an object of the present invention to provide an effective and efficient device for rapidly sealing and bonding in assembly various work pieces, especially for instance, those comprising double glazing units.

When panes of glass and spacers are assembled in a relation providing a trough or channel between the outer faces of the spacers and marginal portions of the panes, resinous material is to be applied in hot molten state to seal the joints between the spacers and the panes and to provide a body of resin in wetting adhesive engagement with the panes of glass and extending between them and thereafter the resinous material is to be cooled to solidify it to hold the panes firmly in spaced, sealed relationship.

The double glazing unit so obtained provides a relationship of the solidified thermoplastic resinous material to the spacer and panes of glass giving firm relative positioning of the panes of glass and spacer by reason of the toughness and firmness of the thermoplastic resin and at the same time providing for limited relative linear movement to accommodate relative dimensional changes caused by differences in temperature of the two panes.

The invention will be described in connection with the accompanying drawings forming part of the disclosure of the present case, in which.

Figure 1:
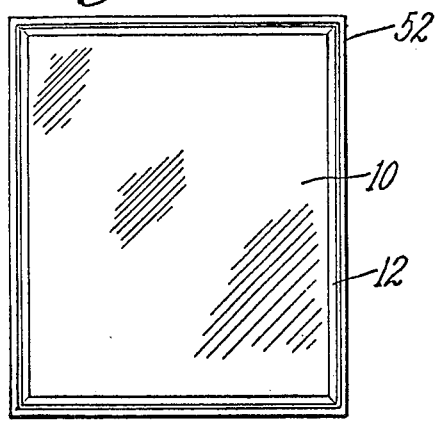
FIG. 1 is a diagrammatic elevational view of a double glazing unit sealed and bonded by an applicator according to the present invention.
Figure 7:
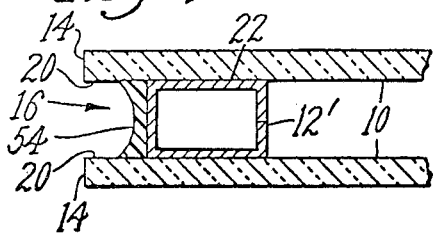
FIG. 7 is a section of a marginal portion of a third form of double glazing unit showing the disposition of bonding and sealing material deposited by the applicator.

The double glazing unit shown in FIG. 1 includes panes 10 of glass and spacers 12 extending parallel to and set in from the edges 14 of the panes 10 to form channels 16, (see FIGS. 2, 5 and 7), defined by the outer edge faces 18 of the spacers 12 and the marginal surfaces 20 of the panes 10 of glass outwardly of the spacers. Separate or combined sealing and bonding material supplied in molten condition and solidified in the channels 16 holds the assembly of glass panes 10 and spacers 12 together as a unit and bars the entry of dust and/or moisture into the space enclosed by the panes and spacers.

The spacers 12 shown in FIGS. 2-7 are hollow channels of uniform, generally rectangular cross section providing surfaces 22 fitting snugly against the inner surfaces of the panes 10 to resist passage of applied liquid bonding or sealing material between the spacers and the panes. The spacers may be of any dimensionally stable material such as metal, plastics or wood. Where they are hollow, desiccant material may be introduced into the hollow space and openings such as slits or holes provided communicating between the hollow space and the space between the panes. The preferred spacer shown in FIGS. 2-6 is formed within inset portions 24 adjacent the outer edge face so that when assembled with panes 10 of glass there are provided recesses 26 between these inset portions 24 and the panes 10 of glass. Such recesses 26 provide certain advantages in the present method and structure but, provided the spacer 12 fits smoothly against the inner surfaces of the panes, many of the advantages of the present invention may be secured with simple rectangular cross section spacer 12' (see FIG. 7) or with circular or other cross section channels or even with simple strips of material (not shown).

For application of separate or combined bonding and sealing material, spacers 12 are assembled between panes 10 of glass and the assembly is clamped firmly together by suitable devices (not shown). If desired, a number of assemblies may be stacked in face-to-face relation and the entire stack clamped together.

Figure 2:
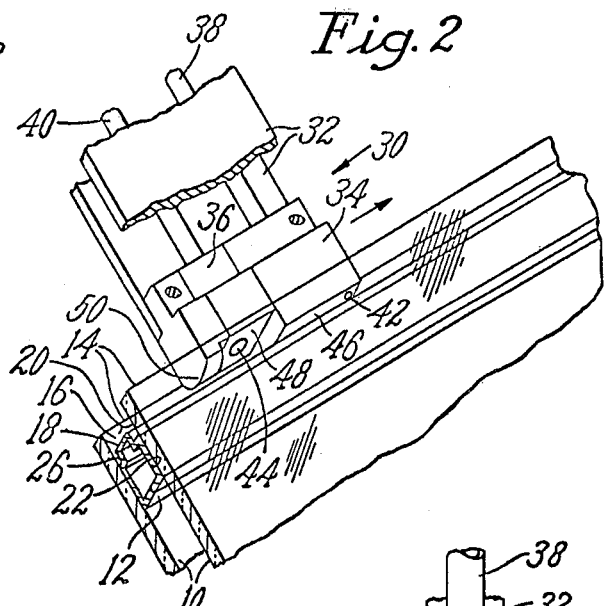
FIG. 2 is an angular view with parts broken away showing the relation of the hot melt applicator as used for assembling glass panes and a spacer for bonding and sealing a double glazing unit.
Figure 3:
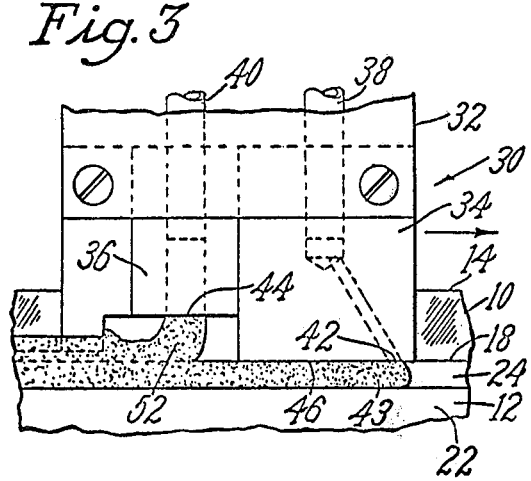
FIG. 3 is a plan view on a larger scale showing the flowing of sealing and bonding material from the hot melt applicator into position in a double glazing unit.
Figure 4:
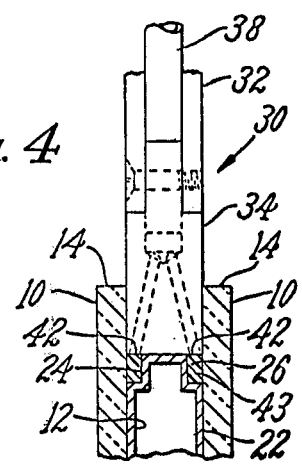
FIG. 4 is an end view showing the applicator sealing a double glazing unit.

Bonding and sealing material is then supplied by a hot-melt applicator 30 (see FIGS. 2-4) in the channels 16 around the edges of the assembly or assemblies. In the applicator shown, support members 32 carry one or more applicator heads 34 and 36 fed by hot melt supply conduits 38 and 40 leading to orifices 42 and 44 for directing molten material into sealing and bonding relation to the panes 10 and spacers 12. Suitable means (not shown) are provided for movement of the support members 32 relative to the assembly or assemblies so that molten material is applied over the entire length of the channels 16. As discussed below this relative movement disposes portions of the applicator heads 34 and 36 to insure uniform filling of the recesses 26 and channel 16 and provides a wiping and shaping of the deposited material by parts of the applicator heads while the material is still hot and deformable. As shown in FIGS. 2-4, the applicator heads 34 and 36 are designed with a width to bring their sides into sliding fit with the marginal surfaces 20 of the panes 10 at the sides of the channel 16. In the applicator shown, the first applicator head 34 is provided with a flat face 46 for sliding engagement with the outer edge face 18 of the spacer, extending from one side to the other of the channel 16 and with orifices 42 opening through this flat face adjacent the sides of the applicator head to force molten material 43 into the recesses 26 (see FIG. 3). The rearward portion of the applicator head 34 confines the molten material within the recess to allow the building up of enough pressure on the molten material to insure complete filling of the recess and act as a smoothing follower for the quickly setting composition.

The second applicator head 36 likewise has a width bringing its sides into sliding fit with the marginal surface portions 20 of the panes at the sides of the channel 16; but the applicator head 36 is so mounted in the support members 32 that the discharge orifice 44 and at least the portions of the face 48 nearest the spacer are held a predetermined distance away from the spacer. Where the head 36 is to be at a different temperature from the first applicator head 34, an insulating layer or other body may be disposed between the two heads. Desirably a smoothing follower 50 is provided to the rear of the orifice 44. This follower 50 may be integral with the portion of the head 36 containing the orifice 44 or may be spring mounted or may even be a piece of spring metal carried on the support members and serves to shape the deposited material while still soft to provide a smooth uniform surface and desired contour on the material within the channel. As shown in FIG. 3, molten material 52 from the orifice 44 flows into contact with the spacer 12, with marginal surface portions 20 of the panes 10 and with the exposed portions of the material 43 in the recesses 26 and is shaped into a concavely formed exposed surface 54 by the rounded portion of the smoothing follower 50.

Summarizing the action of the applicator, molten material from the first orifices 42 is supplied at a temperature and viscosity giving it capability to penetrate into the recesses 26. Because of the thin cross section of the recess the molten material is rapidly cooled and solidified while imparting heat to the glass and the spacer. This heat enables the molten material from the other orifice 44 to bond more strongly to the glass and spacer. Further molten material is supplied from the orifice 44 of the second applicator head 36 to fill the channel 16 to a desired depth. Because of the large mass of materials supplied from the second applicator head 36 it may be advantageous to supply this material at a lower temperature than the material supplied to the recesses 26 in order that it may set up more quickly to a solid condition for bonding the assembly together.

A wide variety of heat softenable separate or combined sealing and bonding materials may be used. It is not necessary that the materials applied in molten condition be permanently thermoplastic but only that they be capable of being reduced by heat from solid to viscous liquid state enabling them to be forced through the conduits and orifices and filling channels, or recesses and channels depending on the shape of the spacers and to set up thereafter by cooling. Accordingly, there may be used natural and/or synthetic thermoplastic resins such as polyesters from reaction and polymerization of polycarboxylic acids such as the aliphatic, aromatic or alicyclic dicarboxylic acids, e.g. adipic acid, azelaic acid, thephthalic acid, isophthalic acid, hexahydrophthalic acid and others with polyols such as glycols, polyalkylene ether polyols and others, polyesters from lactones such as epsilocaprolactones and polyesters from mixtures of these, polyamides from reaction and polymerization of polycarboxylic acid with diamines, polyolefins such as polyethylene, polypropylene, polyisobutylene, and olefin copolymers such as copolymers of ethylene and propylene alone or with a diene, rosin derivatives such as hydrogenated rosin and resin ethers, natural and/or synthetic elastomers such as natural rubber, copolymers of butadiene and other monomers such as styrene, isobutylene and others and polyurethanes, thermosetting resins such as polyglycidyl ethers and mixtures thereof as well as mixtures of thermoplastic and thermosetting resins and elastomers.

The sealant material supplied to the recesses need not be the same as the adhesive material supplied to the channel. In fact, it may be desirable that the sealant material supplied to the recesses be softer than the adhesive and to retain permanent deformability to provide superior sealing action. The sealant material may be associated with the spacers before assembly of the spacers with the glass panes. This may be accomplished by extruding the sealant directly onto the spacers, for example, to fill in the inset portions or alternately a preformed sealer strip may be assembled with the spacer strip. The soft and deformable sealant on the spacers will at least superficially adhere to the glass of the panes when the spacers are assembled with glass and will aid in holding the spacers and panes in registry during assembly and clamping. The web of material formed in the channel must be sufficiently strong to bind the entire assembly and must have at least limited resilience to accomodate relative movement of the panes of glass due to differences in expansion or contraction resulting from differences in temperature between the two panes. The ability of the web to accommodate relative movement is determined by the strength and stiffness of the material and the cross section of the web. In the cross section shown, the central portion of the web is then, preferably of the order of 1/16 inch, for superior flexibility, while the thickness increases to a maximum in portions adjacent the glass to provide a large bonding area.

It is important that at least the material disposed in the channel establish a strong bond to the glass panes. As noted heat from molten material applied to the recesses may aid in prewarming the surfaces to aid in establishing a bond; but it may also be desirable to provide a layer or film of primer or a tie coat on the surface of the glass to be bonded.

Because of varying standards relative to the position of the outer face of the spacer with respect to the other edge of the glass panes, the bonding composition may be selected to provide maximum specification level adhesion for the thickness of composition available from the configuration.

The following examples are given to aid in understanding the invention but it is to be understood that the invention is not restricted to the particular procedures, materials or conditions employed in the examples.

EXAMPLE I

Figure 5:
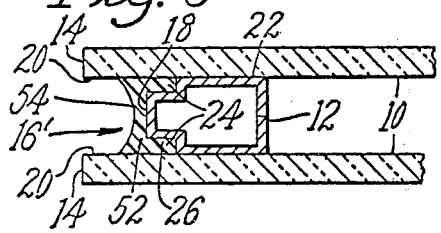
FIG. 5 is a sectional view of a marginal portion of one form of double glazing unit showing the disposition of bonding and sealing material as wiped by the applicator.
Figure 6:
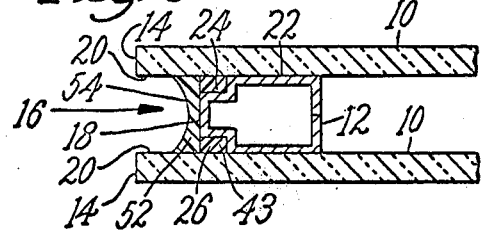
FIG. 6 is a sectional view of a marginal portion of a second form of double glazing unit showing the disposition of bonding and sealing material deposited by the applicator.

Aluminum spacer elements 12 having the cross section shown in FIG. 5 were assembled between panes 10 of glass with their outer edge faces 18 about ⅛ inch from the edges 14 of the panes of glass and the assembly was firmly clamped.

A hot melt applicator 30 was brought up to a temperature of about 300° F. to 325° F. and a molten resinous composition was supplied to the applicator through passageways 38 and 40 leading to the orifices 42 and 44. The composition used was an intimate mixture of 90 parts of a polyester resin prepared from esterification and condensation of 1,4 butane diol with a mixture of dibasic acids in the molar proportion of 6.2 mols of terephthalic acid, 2.0 mols of isophthalic acid and 1.5 mols of sebacic acid, this polyester resin having a melting point of 155° C. to 160° C., and 10 parts by weight of a commercial polyester type plasticizer (Paraplex G41) having a molecular weight of 51, a saponification number of 560 and a viscosity of 1,100 poises at 25° C.

Molten resinous material from the orifices 42 in the first applicator head 34 flowed in smoothly and filled the recesses 26 between the glass and the inset portions 24 of the spacers 12. Abstraction of heat from this material by the glass and spacer caused it to solidify promptly. Molten resin from the orifice 44 of the second applicator head 36 filled the channel 16 defined by the exposed portions 20 of the glass panes 10 and the outer edge faces 18 of the spacers 12 and bonded firmly to the glass panes and to the exposed portions of the resinous material 43 previously deposited in the recesses 26. Heat imparted to the glass by the resinous material previously deposited in the recesses was of assistance in establishing the resulting good adhesive engagement. The heated follower 50 was effective to confine molten material to insure pressure for complete filling of the channels 16 and also smoothed out the resinous material 52 in the channel to provide a desirable appearance. The web of material extending from pane to pane had a thickness of the order of 1/16 inch at its thinnest portion midway between the panes thickening to nearly ⅛ inch adjacent the panes. The rate of applying the molten resin to fill the recesses and the channel was varied, speeds of 10 feet per minute being easily obtainable.

Directly after deposition of the molten material in the recesses and channels around the assembly, the assembly could be unclamped and handled without delays previously required for setting up of edge sealants.

EXAMPLE II

An assembly of panes of glass and spacers was prepared and clamped as in Example I. In this example, a molten sealant material which was softer and more readily deformed than the material employed in Example I was fed to the passageway 38 and orifices 42 of the first applicator head 34. This sealant composition was an intimate mixture of the following materials in the proportions shown:

| | |
|---|---|
| Ethylene vinyl acetate copolymer (melt index 70) | 32 |
| Polyisobutylene (avg. molecular weight 35,000) | 20 |// continued
| Polyethylene (melt index 70) | 8 |
| Hydrogenated rosin, glycerol ester | 24 |
| Paraffin wax (melting point 150–162°F.) | 16 |

The recesses 26 and channels 16 were filled as in Example I and an excellent union was secured at the interface between the material 43 in the recesses 26 and the resinous adhesive material 52 filling the channels 16.

The assembly could be unclamped directly after completion of filling the recesses and channels around its periphery and the resulting assembly was capable of handling without delay.

EXAMPLE III

Sealant composition was extruded in cross section corresponding to the cross section of sealant which would be formed in the recess 26 between spacer 12 and glass panes 10 in Example II and the spacers 12 with this sealant disposed in the inset portions 24 were assembled between panes 10 of glass. The sealant conformed and adhered to the glass panes 10 when the spacers 12 and panes were assembled to aid in maintaining the panes and spacer in desired registry until clamped. Thereafter, molten resinous material of the composition employed in Example I was applied to fill the channel 16 defined by the marginal surface portions 20 of the panels 10 of glass, the upper edges of the deposited sealant and the outer face 18 of the spacer. The deposited molten resinous adhesive 52 joined to the exposed portions of the sealant and bonded to the marginal surface portions 20 of the glass to hold the assembly together as a sealed double pane window assembly.

Having thus described my invention what I claim as new and desire to secure by Letters Patent of the United States is:

1. An applicator for flowing hot melt materials in superposed relation to the channeled periphery of a double glazing unit comprising panes of glass separated by a spacer having an outer surface located inwardly of the edges of said panes, said applicator having opposite sides spaced and formed for sliding fit with the marginal surfaces of the panes, a leading portion of the applicator being provided with a flat face for slidably engaging said outer surface of the spacer, a pair of orifices respectively opening through said flat face progressively to force hot melt into recesses extending longitudinally of the channel one at each side of said longitudinally and a trailing portion of the applicator having an orifice spaced from the outer surface of the spacer for extruding hot melt on the material deposited from said pair of orifices.

2. An applicator as in claim 1 wherein a heated smoothing follower provided rearwardly of the orifice in said trailing portion extends nearer the outer surface of said spacer than the last mentioned orifice and is at least partly rounded to concavely form the exposed surface of the strip of hot melt.

3. An applicator as in claim 1 wherein insulation is provided between the leading and trailing portions of the applicator to enable them effectively to flow molten hot melts at different temperatures, respectively.

4. An applicator as in claim 1 wherein the orifice of the trailing portion is larger than either orifice in the leading portion, and the trailing portion is heated to a lower temperature than the leading portion to enable the exposed hot melt material from the larger orifice to cover and set up more quickly the hot melt from said pair of orifices.

* * * * *

UNITED STATES PATENT OFFICE
CERTIFICATE OF CORRECTION

Patent No. 3,957,406　　　　　　　　Dated May 18, 1976

Inventor(s) William R. Battersby

It is certified that error appears in the above-identified patent and that said Letters Patent are hereby corrected as shown below:

Column 6, line 51, delete "longitudinally" and insert -- face --.

Signed and Sealed this

Twenty-fourth Day of August 1976

[SEAL]

Attest:

RUTH C. MASON
*Attesting Officer*

C. MARSHALL DANN
*Commissioner of Patents and Trademarks*